United States Patent [19]
McDonough et al.

[11] Patent Number: 6,151,686
[45] Date of Patent: *Nov. 21, 2000

[54] MANAGING AN INFORMATION RETRIEVAL PROBLEM

[75] Inventors: John C. McDonough, Braintree; Michael P. Amatucci, Bolton; Louis A. Iannucci, Hudson; David M. Ingham, Newton; Thiagarajan Saravanan, Westborough, all of Mass.

[73] Assignee: FMR Corp., Boston, Mass.

[ * ] Notice: This patent issued on a continued prosecution application filed under 37 CFR 1.53(d), and is subject to the twenty year patent term provisions of 35 U.S.C. 154(a)(2).

[21] Appl. No.: 08/870,814

[22] Filed: Jun. 6, 1997

[51] Int. Cl.$^7$ .......................... H02H 3/05; H03K 19/003; H04B 1/74; H04L 1/22

[52] U.S. Cl. ................................. 714/37; 714/43; 714/48; 707/3

[58] Field of Search ........................ 395/183.13, 183.02, 395/200.54, 183.04; 706/908; 707/10, 3; 364/276.3; 709/224; 714/4, 19, 13, 37, 47, 48, 26, 28, 23

[56] References Cited

U.S. PATENT DOCUMENTS

| | | | |
|---|---|---|---|
| 5,129,080 | 7/1992 | Smith | 712/232 |
| 5,159,685 | 10/1992 | Kung | 395/183.02 |
| 5,287,505 | 2/1994 | Calvert et al. | 707/10 |
| 5,337,320 | 8/1994 | Kung | 395/183.02 |
| 5,548,715 | 8/1996 | Maloney et al. | 395/183.04 |
| 5,561,770 | 10/1996 | De Bruijn et al. | 714/13 |
| 5,664,106 | 9/1997 | Caccavale | 395/200.54 |
| 5,708,775 | 1/1998 | Nakamura | 714/48 |
| 5,724,512 | 3/1998 | Winterbottom | 707/10 |
| 5,764,906 | 6/1998 | Edelstein et al. | 395/200.49 |
| 5,832,514 | 11/1998 | Norin et al. | 707/202 |
| 5,870,540 | 2/1999 | Wang et al. | 714/43 |
| 5,907,848 | 5/1999 | Zaiken et al. | 707/202 |
| 5,918,229 | 6/1999 | Davis et al. | 707/10 |
| 6,003,030 | 12/1999 | Kenner et al. | 707/10 |

FOREIGN PATENT DOCUMENTS

| | | |
|---|---|---|
| 0 474 058 A2 | 11/1992 | European Pat. Off. . |
| 0 747 840 A1 | 11/1996 | European Pat. Off. . |
| 1 591 358 | 5/1970 | France . |

OTHER PUBLICATIONS

Rivest, "The MD5 Message–Digest Algorithm", http://andrew2.andrew.cmu.edu/rfc/rfc1321.html, 25 pages, Apr. 1992.

Freier et al., "The SSL Protocol Version 3.0," http://home.netscape.com/eng/ss13/ss;–toc.html, 3 pages, Mar. 1996.

"Netscape Data Security", http://cgi.netscape.com/newsref/ref/netscape–security.html, 4 pages, 1997.

"Persistent Client State HTTP Cookies", http://cgi.netscape.com/newsref/std/cookie_spec.html, 5 pages, 1997.

"Basic HTTP as defined in 1992", http://www.w3.org/pub/WWW/Protocols/HTTP/HTTP2.html, 31 pages, 1992.

Berners–Lee, "Hypertext Transfer Protocol—HTTP/1.0", http://ds.internic.net/rfc/rfc1945.txt, 53 pages, May 1996.

(List continued on next page.)

*Primary Examiner*—William Grant
*Assistant Examiner*—Victoria Robinson
*Attorney, Agent, or Firm*—Fish & Richardson P.C.

[57] ABSTRACT

Provided is a method of managing a problem with retrieving information from a computer system. The method includes automatically generating a request for the information, testing whether the problem is indicated by a result of the request, and, based on the testing, automatically determining whether human intervention is required.

33 Claims, 2 Drawing Sheets

Microfiche Appendix Included
(4 Microfiche, 223 Pages)

OTHER PUBLICATIONS

Fielding, "Hypertext Transfer Protocol—HTTP/1.1", http://www.w3.org/pub/WWW/Protocols/rfc2068/rfc2068, 143 pages, Jan. 1997.

Netscape's DDE Implementation, http://www.netscape.com/newsref/std/ddeapi.html, Mar. 1995, 14 pages.

Mitch Wagner, Tracking service helps companies get a handle on Internet problems, Oct. 7, 1996, Computerworld, vol. 30, No. 41, pp.69,77.

Eamonn Sullivan, Too Many Cooks Spoil Web Server, Jul. 29, 1996, PCWeek, vol. 13 Issue 30, p. N3.

Stephen Cobb, Secure Your Online Data Projects, April 1997, Databased Web Advisor, pp. 70–75.

WebEye's Watching, Feb. 3, 1997 Communications Week, p. 57.

Internet Resources Group, Sep. 11, 1995, M2 PressWire.

Jeff Moad, Overheated Web, Sep. 16, 1996, PC Week, vol. 13, No. 37, p. 49.

How to tell if users can access your Web pages, Oct. 1995, Electronic Documents, vol. 4, No. 10 pp.22–23.

MANAGING AN INFORMATION RETRIEVAL PROBLEM

REFERENCE TO MICROFICHE APPENDIX

An appendix forms part of this application. The appendix, which includes a source code listing relating to an embodiment of the invention, includes 223 frames on 4 sheets of microfiche.

BACKGROUND OF THE INVENTION

This invention relates to managing an information retrieval problem.

A computer system (e.g., a World-Wide Web server connected to the Internet) may store information (e.g., Web pages providing product information) expected to be retrievable by many users, including other computer systems. Network malfunctions, deliberate sabotage, data storage failures, software bugs, and the like can cause problems with such retrieval. Typically, the system is maintained by a human administrator who attempts to achieve early warning of such problems by testing periodically (e.g., hourly) whether the information can be retrieved. In the case of a World-Wide Web server connected to the Internet, the administrator accomplishes such testing by running and directing browser software such as Netscape® Navigator™ to retrieve and display Web pages from the server across the Internet.

SUMMARY OF THE INVENTION

In one general aspect, the invention features a method of managing a problem with retrieving information from a computer system. The method includes automatically generating a request for the information, testing whether the problem is indicated by a result of the request, and, based on the testing, automatically determining whether human intervention is required. Thus the method eases the burden on a computer system administrator expected to be vigilant about problems with retrieving information from the system. If the request is re-sent often (e.g., every five minutes), followed up if necessary by a notification by, e.g., a paging system, the administrator is likely to provided with nearly immediate warning about a serious retrieval problem.

Implementations of this or another aspect of the invention may include one or more of the following features. The information may be arranged to be retrieved across a computer network. The problem may be categorized or it may be determined whether the problem is a recurrence, wherein the human intervention determination may be based on the category of the problem or on the recurrence determination, respectively. Based on the testing, a computer program may be automatically restarted (e.g., in case the result is due to a difficulty with a testing program), and the human intervention determination may be based on a result of the automatic restarting. Thus, the administrator may be freed from having to intervene in response to detection of minor or non-recurring problems, or problems that can be resolved by such a restart.

Generation of the request or retrieval of the information may be based on Internet browser software or a feature of a computer program. Thus, if the request is generated with the same software (e.g., the Internet browser software) used normally to retrieve the information, retrieval problems may be accurately detected.

A response to the request may be received, and at least a portion of the response may be compared to control data. The information to be retrieved may include static data and dynamic data, and a comparison may be made of only the static data to control data. The response may include an indicator, and, based on the indicator, a comparison of a portion of the response to control data may be avoided.

Depending on the outcome of the human intervention determination, an automatic attempt may be made to notify a person, e.g., as noted above, by a paging system.

DESCRIPTION OF THE PREFERRED EMBODIMENTS

Figure 1:
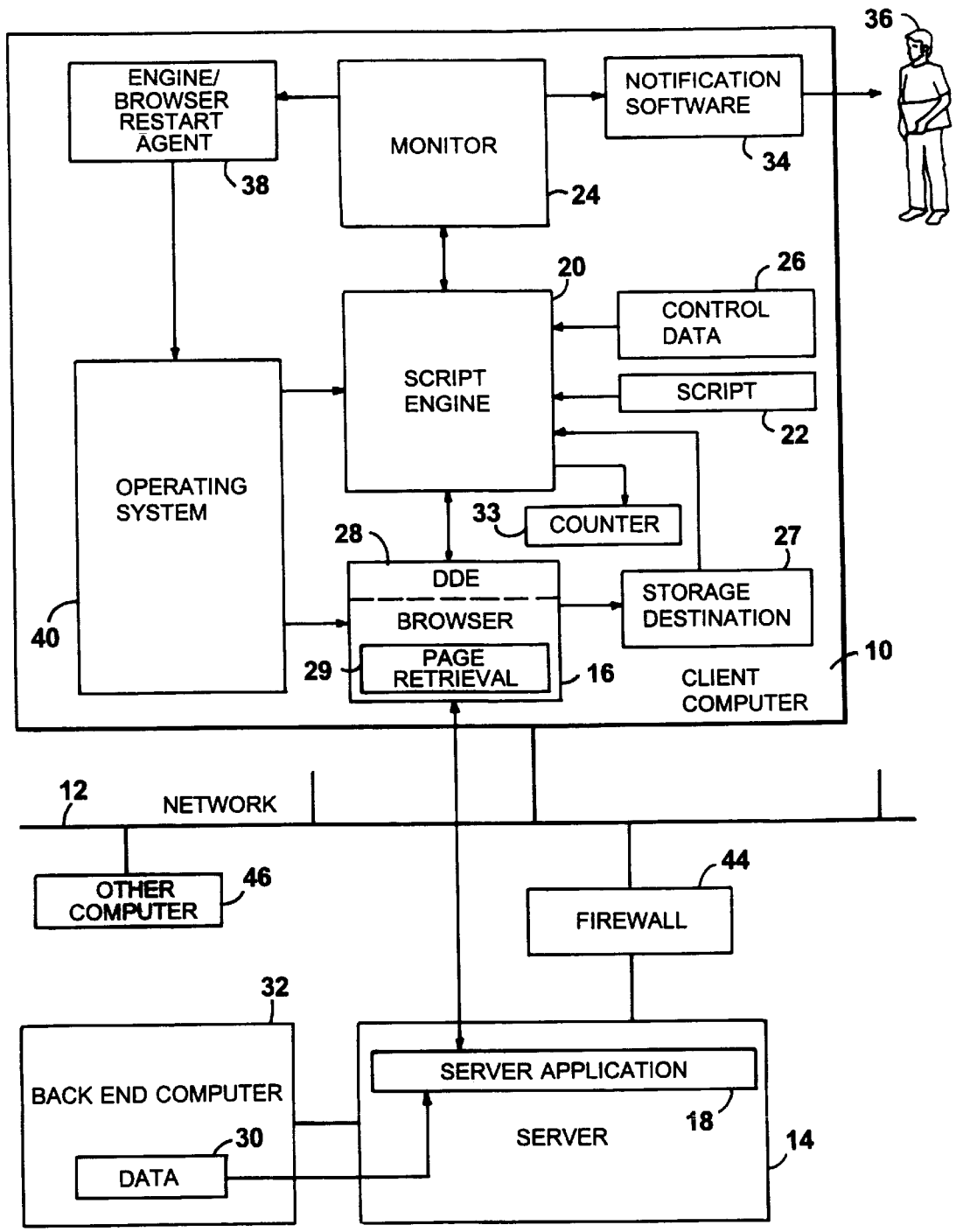
FIG. 1 is a block diagram of a computer system.
Figure 2:
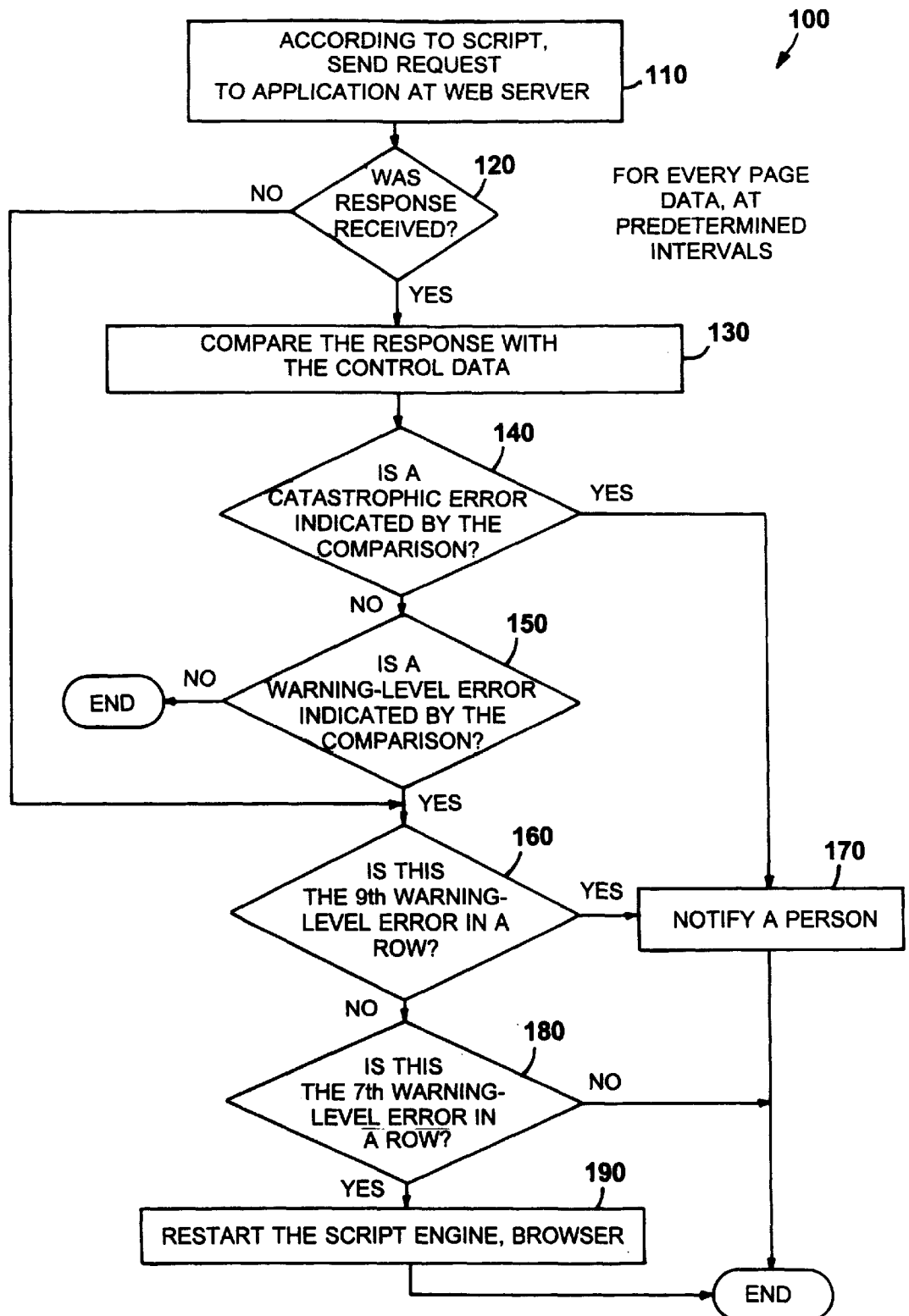
FIG. 2 is a flow diagram of a procedure executed by the computer system.

FIG. 1 illustrates a client computer 10 connected to a server computer 14 by a network 12 such as the Internet or a local-area network based on Internet or other protocols. The client computer runs browser software 16 (such as Netscape® Navigator™ version 2.0 or 3.0) that is able to retrieve formatted data (such as data constituting a World-Wide Web page) from server application software 18 running on the server computer. Also running on the client computer are script engine software 20 that executes according to a script 22, and monitor software 24. By a procedure 100 illustrated in FIG. 2, the script engine software and monitor software operate automatically to detect problems with retrieving the formatted data from the server application software. The problems are detected by automatically sending a request that is expected to provoke a response from the server application software, determining whether any response was received, and if so, comparing the response to a set of control data 26.

The script provides a list of pages of the formatted data to be tested for detection of problems. For each page listed, a Uniform Resource Locator string ("URL", i.e., a network address such as "http://www.uspto.gov/" for the page) and a storage destination 27 (such as a computer file) for the expected response are specified in the script. Now referring again to FIG. 2, for each page, at predetermined intervals (such as every five minutes), the script engine software causes generation of a request based on the URL, and directs the request to the server application software (step 110), and the script engine and monitor software follow up as described below.

The script engine generates the request by invoking a page retrieval function 29 (known as "WWW_OpenURL (qcsURL, qcsSaveAs, dwFlags)") that is accessible via a Dynamic Data Exchange ("DDE") interface 28 of the browser software. The DDE interface is described in electronic documents available on the World-Wide Web at http://www.netscape.com/newsref/std/ddeapi.html, and incorporated by reference. (DDE is a specification that allows a software program, here the browser software, to make certain ones of its functions available for use by another software program, here the script engine.) In the invocation, the script engine software sets the "qcsURL" and "qcsSaveAs" parameters to the URL and storage destination, respectively, specified in the script. Note that for performance reasons the browser software may be configured to retain (in one or more computer files known collectively as a "cache", which is not associated with the server application software) and use a copy of a previous response received to a previous request that was based on the same URL. Such use could thwart the purpose of sending the present request, which purpose is to detect problems with retrieving the formatted data from the server application software across the network. Consequently, in the invocation, the script engine software also sets the "dwFlags" parameter to direct the browser software to avoid referring to the cache during handling the retrieval of the expected response to the present request.

After invoking the page retrieval function of the browser software, the script engine software then determines whether any response was received (step 120). The determination is made by examining a result (known as "dwServicingWindowID") returned to the script engine software by the page retrieval function. If the result is "0×0" or "0×FFFFFFFF", the script engine software determines that no response was received (which counts as a warning-level error as described below) and then proceeds according to step 160 described below.

Otherwise, the script engine software determines that a response was received and was stored at the storage destination, and the script engine software compares the received response to the set of control data (step 130). What is included in the set of control data is predetermined and depends on the characteristics of the page expected in the received response. For example, the page may be a static data file (e.g., a text file) provided to the browser software by the server application software. If so, a copy of the static data file serves as the set of control data, and the comparison involves determining differences between the received response (i.e., the file specified for "qcsSaveAs") and the copy of the static data file, an exact match being expected.

Alternatively, the server application software may produce the page dynamically, based on a combination of a template (e.g., indicating "The latest price of XYZ stock is #sc {XYZ$_{13}$ stock$_{13}$ price} #sc") and dynamic data (e.g., representing the price of XYZ stock and replacing "{XYZ$_{13}$ stock$_{13}$ price}" in the template). If so, in the comparison, the script engine software expects an exact match between the set of control data (which is a copy of the template) and only a portion of the received response, because the set of control data does not include a copy of the dynamic data. Which portion the script engine software is not to compare is bounded in the template by "#sc" strings (which are not displayed when the template is used normally to provide a display on a computer screen).

At the point of comparison, the script engine software also checks for certain special cases. For example, the page may constitute two overlaid pages, where the first page includes blank fields expected to be filled in by the second page, which includes back end data 30 (such as an account number or a customer name) stored by a backend computer 32. In such a case, the script engine software checks the received response to determine whether the blank fields are filled in. In another example, the received response may not match the set of control data but may include other expected data, such as a "try again later" notice that is provided by the server application software when the back end computer is temporarily unavailable due to routine maintenance or a temporary backlog.

Next, it is automatically determined whether the comparison indicates an error, either catastrophic (i.e., meriting immediate attention based on one instance) or warning-level (i.e., meriting attention only after multiple consecutive instances) (steps 140, 150, respectively). If no error is indicated, no action is taken (until the procedure is executed again) other than resetting a consecutive-error counter 33 that is stored in non-volatile memory and that is used as described below.

A catastrophic error is indicated if an exact match (or the aforementioned other expected data) is not found in the received response where expected, which signifies detection of a problem in that the page has been deliberately or accidentally replaced or altered. In particular, such an indication is merited due to the possibility that an unauthorized person (known as a "hacker", e.g., a disgruntled customer) who aims to cause detriment to a legitimate sponsor (e.g., a company) of the page (which, e.g., touts the virtues of the company's products) has replaced or altered the page (e.g., to convey negative information about the company). The sponsor can suffer a detriment even if there is an accidental alteration attributable to, e.g., garbled data due to a server computer memory failure where the page includes important numbers such as customer support or sales telephone numbers. In addition, a catastrophic error is indicated if the aforementioned blank fields are not filled in, which indicates a malfunction in the back-end computer.

If a catastrophic error is indicated, notification software 34 (e.g., software linked to a paging system) is used to notify a person 36 such as a pocket-pager-equipped network administrator (step 170), for whom the received response is retained for subsequent inspection. No further action is taken until the procedure is executed again.

On the other hand, a warning-level error is indicated if no response is received, or if the received response includes the aforementioned other expected data such as the "try again later" notice. Such cases do not lead to an indication of a catastrophic error, because such cases may not recur immediately despite the lack of intervention by a person. For example, the lack of a response may be due to an infrequent network overload or network data loss.

It is determined whether the warning-level error is the ninth in a row (based on the consecutive-error counter), indicating detection of a problem expected to recur indefinitely until intervention by a person (step 160). If so, a person is notified as mentioned above, and no further action is taken until the procedure is executed again.

Otherwise, it is determined whether the warning-level is only the seventh in a row, indicating detection of a problem that warrants an automated repair attempt (step 180). If not, no further action is taken until the procedure is executed again.

On the other hand, if so, an automated repair is attempted (step 190), wherein the monitor software directs engine/ browser restart agent software 38 to cause operating system software 40 to shut down and restart the script engine software and the browser software. The restarts are executed in case the problem detected is a result of a malfunction that has developed with detection, i.e., with the script engine software or the browser software.

No further action is taken at this point, until the procedure is executed again. If such restarts do resolve the problem detected, the consecutive-error counter is reset as mentioned above when the procedure is executed again. If resolution (based on the restarts or otherwise) does not occur within the next two executions of the procedure, the consecutive-error counter reaches nine and a person is notified, in accordance with aforementioned steps 160, 170.

The retrieved page may include text formatted in accordance with, e.g., a specification known as Hypertext Markup Language ("HTML"). The browser software may be, e.g., Netscape® Navigator™ 2.0 or 3.0 (as mentioned above) or Microsoft® Internet Explorer 3.0, or any other software allowing automated page retrieval. The server computer may include, e.g., a Compaq® ProLiant™ or an IBM®

RS6000 running an operating system such as Microsoft® Windows® NT or IBM® OS/2 or AIX. The network may be based on a protocol such as Transmission Control Protocol and Internet Protocol ("TCP/IP"). The client computer may include a personal computer having a processor such as an Intel® Pentium®. The operating system may be, e.g., Microsoft® Windows® NT, Microsoft® Windows®95, UNIX®, OS/2®, or compatible with Java™. The back end computer may include, e.g., an IBM® 3090 running an operating system such as IBM® MVS 5.2, or a Pyramid® NILE™ computer.

The technique (i.e., the procedure described above) may be implemented in hardware or software, or a combination of both. Preferably, the technique is implemented in computer programs (such as the monitor software and script engine software described above) executing on programmable computers that each include a processor, a storage medium readable by the processor (including volatile and non-volatile memory and/or storage elements), at least one input device such as a keyboard, and at least one output device. Program code is applied to data entered using the input device to perform the method described above and to generate output information. The output information is applied to one or more output devices such as a display screen of the client computer.

Each program is preferably implemented in a high level procedural or object-oriented programming language (such as C in combination with a Borland® International Delphi™ toolkit) to communicate with a computer system. However, the programs can be implemented in assembly or machine language, if desired. In any case, the language may be a compiled or interpreted language.

Each such computer program is preferably stored on a storage medium or device (e.g., ROM or magnetic diskette) that is readable by a general or special purpose programmable computer for configuring and operating the computer when the storage medium or device is read by the computer to perform the procedures described in this document. The system may also be considered to be implemented as a computer-readable storage medium, configured with a computer program, where the storage medium so configured causes a computer to operate in a specific and predefined manner.

Other embodiments are within the scope of the following claims. For example, all of the software may run on (and the script and the set of control data may be stored at) the server computer, allowing local (i.e., not network-based) detection of problems with retrieving the formatted data from the server application software. However, such an alternative arrangement is likely to fail to detect such a problem that develops as a result of a malfunction occurring outside the server computer. Such a malfunction could be accidental, e.g., with a security system 44 (known as a "firewall") that governs network access to the server computer, or could be deliberate, e.g., involving a hacker's redirection of URL-based requests away from the server computer and to another computer 46 on the network.

In another example, on the network, the server computer may have at least one load-sharing counterpart server computer (e.g., an IBM® RS6000 running an operating system such as IBM® OS/2 or AIX) that stores duplicates of the pages of formatted data stored by the server computer. In normal use in such a case, when a URL-based request is generated, the URL (e.g., "http://www.uspto.gov/") is generic, i.e., does not distinguish between the two or more server computers. Rather, in normal use, the generic URL is transparently translated into a specific network address that directs the request to a lesser- or least-burdened of the two or more server computers. In such a case where the URL is generic, the script engine software deals with each server computer in turn (e.g., by alternating if there are only two server computers), using the same script with each specific network address.

The notification software may cause a person to be notified by one or more means available, such as electronic mail, fax, telephone, interoffice mail, network message, siren, or radio.

Depending on the capabilities of the browser software, the page of formatted data may include images as well as text. Thus, a problem is detected if image data is deliberately or accidentally altered. Also, time-related problems (e.g., delays) with page retrieval may be detected, by keeping track of when the request is sent and when the response is received. A log may be kept of such times and other details about executions of the procedure, to allow a detailed analysis of procedure-related events in general and problems detected in particular.

The monitor software and the server computer may be arranged so that the monitor software can cause the server application software to be shut down and restarted.

This patent document (including the microfiche appendix) contains material that is subject to copyright protection. The copyright owner has no objection to the facsimile reproduction by anyone of the patent document as it appears in the Patent and Trademark Office file or records, but otherwise reserves all copyright rights whatsoever.

What is claimed is:

1. A method for use in maintaining accessibility to stored data provided by a network server, comprising:

automatically generating a request for information included in the stored data Provided by the network server;

transmitting the request to the network server over a network connection;

testing a result of the request transmitted to the network server to determine whether there is a problem with accessibility to the stored data provided by the network server; and based on the testing, automatically determining whether to restart a computer program.

2. The method of claim 1, wherein the information is arranged to be retrieved across a computer network.

3. The method of claim 1, further comprising determining whether the problem comprises a recurrence.

4. The method of claim 1, further comprising basing generation of the request on Internet browser software.

5. The method of claim 1, further comprising basing generation of the request on a feature of a computer program.

6. The method of claim 1, further comprising basing retrieval of the information on a feature of a computer program.

7. The method of claim 1, further comprising receiving a response to the request; and comparing at least a portion of the response to control data.

8. The method of claim 1, wherein the information includes static data and dynamic data; and the method further comprises comparing only the static data to control data.

9. The method of claim 1, further comprising receiving a response to the request, the response including an indicator; and based on the indicator, avoiding a comparison of a portion of the response to control data.

10. The method of claim 1, further comprising based on the testing, automatically determining whether human intervention is required.

11. The method of claim 10, further comprising categorizing the problem, wherein the human intervention determination is based on the category of the problem.

12. The method of claim 10, further comprising basing the human intervention determination on a result of an automatic restarting of a computer program.

13. The method of claim 10, further comprising depending on the outcome of the human intervention determination, automatically attempting to notify a person.

14. The method of claim 13, further comprising basing the notification attempt on a paging system.

15. The method of claim 1, wherein the computer program comprises a computer program that handles the generating of requests and testing of the results.

16. Computer software, residing on a computer-readable storage medium, comprising instructions for use in a computer system for maintaining accessibility to stored data provided by a network server, the instructions causing the computer system to:

automatically generate a request for information included in the stored data provided by the network server transmit the request to the network server over a network connection;

test a result of the request transmitted to the network server to determine whether there is a problem with accessibility to the stored data provided by the network server; and based on the testing, automatically determine whether to restart a computer program.

17. The computer software of claim 16, wherein the information is arranged to be retrieved across a computer network.

18. The computer software of claim 16, wherein the computer software further comprises instructions for causing the computer system to determine whether the problem comprises a recurrence.

19. The computer software of claim 16, wherein the computer software further comprises instructions for causing the computer system to base generation of the request on Internet browser software.

20. The computer software of claim 16, wherein the computer software further comprises instructions for causing the computer system to base generation of the request on a feature of a computer program.

21. The computer software of claim 16, wherein the computer software further comprises instructions for causing the computer system to base retrieval of the information on a feature of a computer program.

22. The computer software of claim 16, wherein the computer software further comprises instructions for causing the computer system to:

receive a response to the request; and compare at least a portion of the response to control data.

23. The computer software of claim 16, wherein the information includes static data and dynamic data; and the computer software further comprises instructions for causing the computer system to compare only the static data to control data.

24. The computer software of claim 16, wherein the computer software further comprises instructions for causing the computer system to:

receive a response to the request, the response including an indicator; and based on the indicator, avoid a comparison of a portion of the response to control data.

25. The computer software of claim 16, further comprising instructions for causing the computer system to automatically determine whether human intervention is required.

26. The computer software of claim 25, wherein the computer software further comprises instructions for causing the computer system to categorize the problem, wherein the human intervention determination is based on the category of the problem.

27. The computer software of claim 25, wherein the computer software further comprises instructions for causing the computer system to base the human intervention determination on a result of an automatic restarting of a computer program.

28. The computer software of claim 25, wherein the computer software further comprises instructions for causing the computer system to:

depending on the outcome of the human intervention determination, automatically attempt to notify a person.

29. The computer software of claim 28, wherein the computer software further comprises instructions for causing the computer system to base the notification attempt on a paging system.

30. A system for use in maintaining accessibility to stored data provided by a network server, comprising means for automatically generating a request for information included in the stored data provided by the network server;

means for transmitting the request to the network server over a network connection;

means for testing a result of the request to determine whether there is a problem with accessibility of the stored data provided by the network server; and means for, based on the testing, automatically determining whether to restart a computer program.

31. A method for use in maintaining accessibility to a resource provided by a network server, comprising:

receiving a template that includes static data and one or more indicators of variable data;

automatically generating a request for information provided by the resource;

transmitting the generated request to the network server over a network connection;

receiving a response to the request; and determining whether a network access problem exists by comparing the static data of the template to data received in response to the generated request.

32. The method of claim 31, further comprising determining whether human intervention is required based on the comparison.

33. The method of claim 31 wherein the request comprises a request for information at a URL (Uniform Resource Locator).

* * * * *